April 13, 1926.
W. R. UGGLA
1,580,769
YIELDABLE TOOTHED WHEEL, CLUTCH, AND THE LIKE
Filed Jan. 30, 1924    2 Sheets-Sheet 1
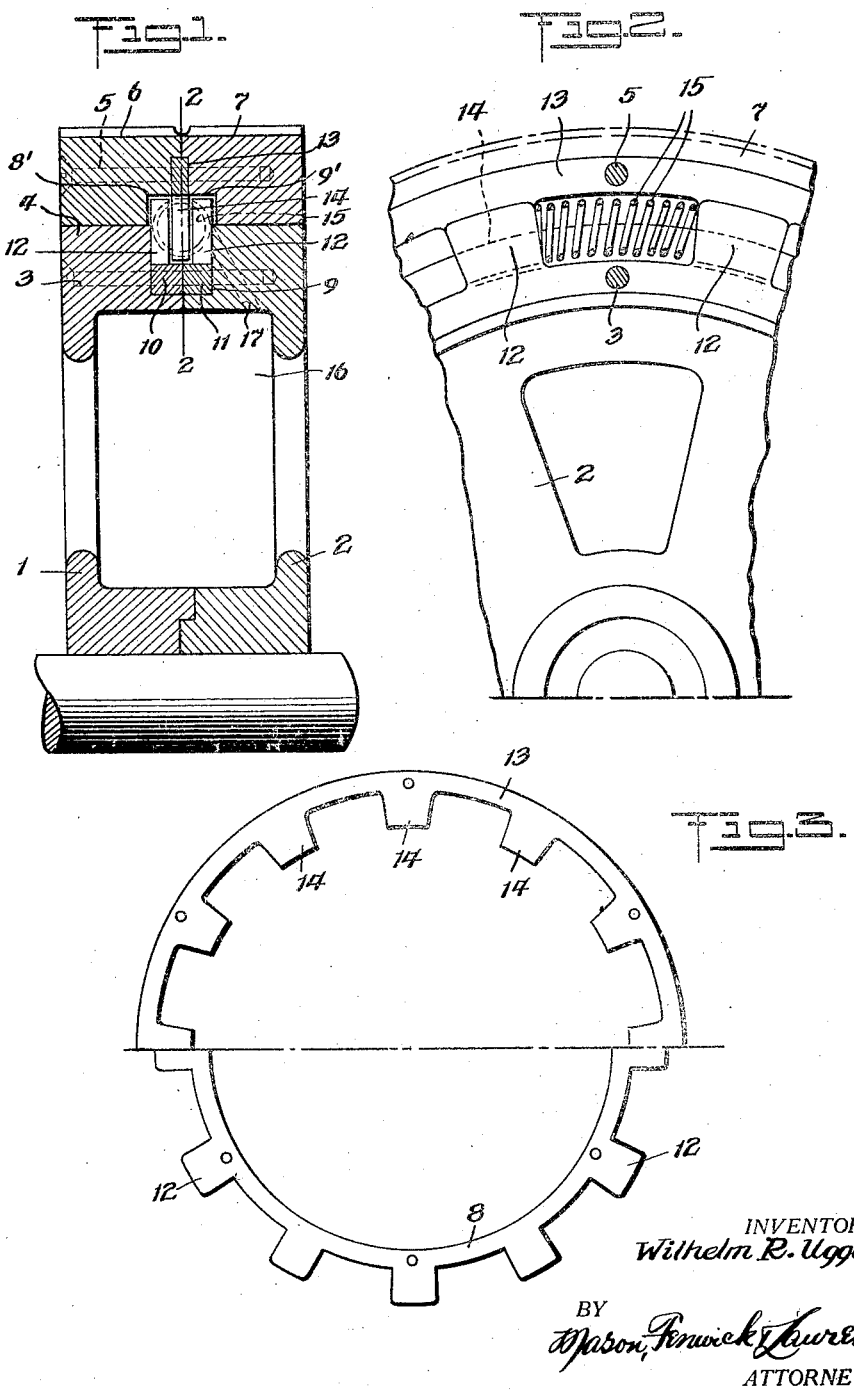
INVENTOR
Wilhelm R. Uggla
BY
Mason, Fenwick & Lawrence
ATTORNEYS

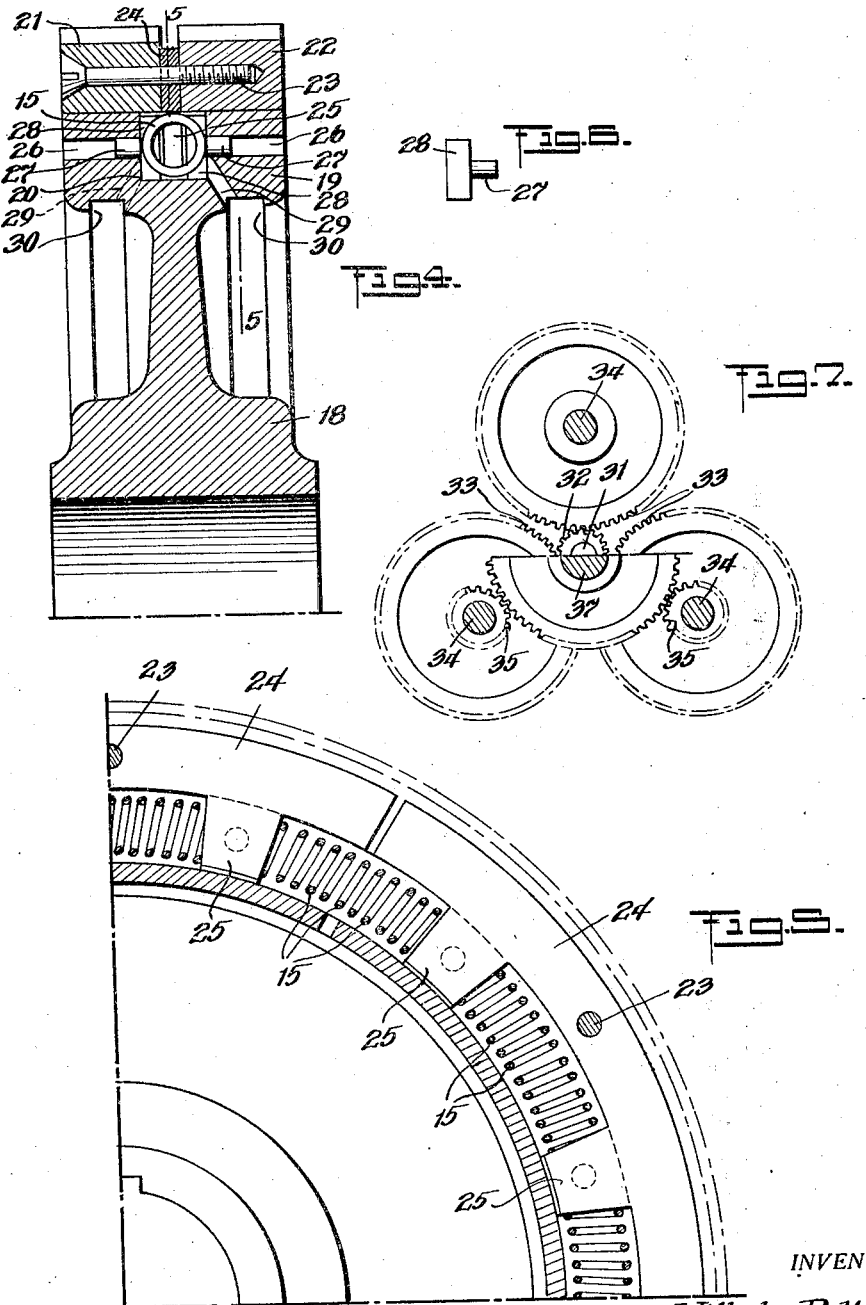

Patented Apr. 13, 1926.

1,580,769

UNITED STATES PATENT OFFICE.

WILHELM ROBERT UGGLA, OF STOCKHOLM, SWEDEN.

YIELDABLE TOOTHED WHEEL, CLUTCH, AND THE LIKE.

Application filed January 30, 1924. Serial No. 689,577.

*To all whom it may concern:*

Be it known that I, WILHELM ROBERT UGGLA, a subject of the King of Sweden, residing at Gotgatan 26, Stockholm, in the Kingdom of Sweden, have invented certain new and useful Improvements in Yieldable Toothed Wheels, Clutches, and the like, of which the following is a specification.

This invention relates to toothed wheels, clutches and the like and relates to means for obtaining a greater transmission of power wherein spiral springs are located peripherically between projections on the hub and on a toothed peripherically movable rim of the wheel, the said springs acting to softly transmit the motion from the hub to the said rim or vice versa. According to the invention projections are provided on the hub and the toothed rim in such a manner that the projections of the said two members embrace each other like fork shanks, owing to which fact the projections may move relatively to each other. The projections extend for such a distance over each other, that the springs interposed between the sets of projections, bear by means of their ends directly against the projections and thus are centrally loaded. During the operation of the wheel all the said springs are subjected to pressure for transmitting motion between the hub and the toothed rim in one or the other direction. The invention also comprises details of construction of the said wheels etc.

Examples of the invention are illustrated in the accompanying drawings in which Figure 1 shows in cross section a part of a yieldable toothed wheel, arranged according to one form of the invention. Figure 2 is a section on the line 2—2 of Figure 1. The upper part of Figure 3 shows half of a ring, provided with internal projections, adapted to be fixed to the toothed rim, while the lower part shows half of a ring, provided with external projections and adapted to be fixed to the hub part of the wheel. Figure 4 shows is cross section a part of a yieldable toothed wheel arranged according to a second form of the invention, Figure 5 being a section on the line 5—5 of Figure 4. Figure 6 shows a detail. Figure 7 is a side view of a toothed gearing, some of the wheels of which may be arranged in accordance with this invention.

In the toothed wheel shown in Figures 1 to 3 inclusive, which may be provided with V-shaped teeth, the hub is divided transversally of the centre axis of the wheel, into two parts 1 and 2, connected by bolts or screws 3. The said parts form together a peripherical ring 4, on which the toothed rim, which comprises two rings 6 and 7, provided with suitable teeth, and connected together by screws 5, is movable peripherically. In a groove in the ring 4, which groove is formed by annular recesses provided in the opposed sides of the parts 1 and 2, two rings 8 and 9 are secured by means of screws 3. Half of one of the said rings 8 is shown in Figure 3. The said rings 8 and 9 are provided with lateral projections or flanges 10 and 11 respectively, bearing against one another, and with external projections or teeth 12. Owing to the projections or flanges 10 and 11 the teeth 12 of the rings 8 and 9 are located at some distance from each other, as shown in Fig. 1. The said teeth 12 project into corresponding annular recesses $8^1$ and $9^1$ which are provided in the opposed sides of the rings 6 and 7. Between the rings 6 and 7 a central ring 13 is located secured to the rings by means of screws 5. This ring 13 is provided with internal projections or teeth 14. Figures 1 and 3 which project into the space between the teeth 12 of the rings 8 and 9, so that three sets of teeth are located in the same radial plane extending longitudinally of the axis of the wheel. Between the sets of teeth 12 and 14, spiral springs 15 are located, the ends of which bear against the sets of teeth respectively. The teeth of each set prevent the outer toothed rings 6 and 7 from being moved axially on the ring 4.

If now the hub is the driving member of the wheel, the teeth 12 tend to move the springs 15 and compress the same to a certain degree, the teeth 12 of each set being thus somewhat displaced with relation to the central teeth 14. During this operation the springs bearing against the teeth 14 of the ring 13 cause the toothed rim 6, 7 to rotate. Owing to the provision of the springs a resilient transmission of the motion, free from jerks, is effected, in which transmission all the springs partake. It is just the same when the toothed rim constitutes the driving member and in whichever direction the hub or the toothed rim is driven. Owing to the fact that the springs 15 only bear against the teeth 12 and 14 and are not fixed to the same, it is sufficient to place the springs, having a certain initial tension, in to the spaces between the sets of teeth. The manufacture of the yieldable wheel is thereby considerably facilitated. The length of the springs may be adjusted in such an exact manner that all springs operate practically in the same degree for the transmission of the power between the hub and the toothed rim. As seen from Fig. 1 the springs 15 bear against the teeth 12 and 14 over their whole end, owing to which fact the springs are centrally loaded.

The dimensions of the springs and the pitch of same are so adapted that, if the wheel is overloaded, the springs are wholly compressed, without the strain on them being so great that they break. Consequently when the wheel is overloaded, the springs constitute substantially solid abutments between the hub and the toothed rim. If, however, any of the springs or the teeth 12 and 14 should break, no pieces will come out from the wheel, because, as shown in Figure 1, all members are enclosed in a perfectly closed chamber effected by the recesses 8, 9, $8^1$ and $9^1$. This is of great importance, because otherwise broken parts which might fall out, might enter, for instance, into the spaces between the teeth of the gear wheels and break or damage the wheels.

The hub ring 4 on its inner side may be provided with a groove 16 adapted to receive lubricating oil, supplied, for instance, by suitable means from an oil chamber in which the wheel, preferably rotates. The oil passes through openings 17, provided in the hub ring, into the chamber containing the springs and lubricates the bearing surfaces of same as well as the bearing surfaces of the teeth 12 and 14 of the rings 8 and 13 and the toothed rim and the hub ring respectively.

In the toothed wheel, which is shown in Figs. 4 and 5, and which may be provided with V-shaped teeth, the hub 18 is made in a single piece. The outer or rim portion 19 of this hub is provided with a central annular groove 20. The outer toothed rim is, as in the previous example, divided into two halves 21 and 22, connected by screws 23. The said screws also secure ring sections 24, located between the members 21 and 22 of the rim, and provided with internal teeth or lugs 25. In the rim-portion 19 transverse holes 26 are drilled, which extend to the groove 20 and are located opposite to one another in pairs. Dies or plates 28, Figure 6, each provided with a lateral pin 27, are located in the groove 20, the pins 27 projecting into the said holes 26. The said dies 28 are so located on opposite sides of the teeth 25 of the ring sections 24, that one tooth 25 and two dies 28 together constitue a set of projections in the hub ring and the toothed rim. Between the said sets spiral springs 15, under a certain initial tension, are located. Springs, teeth and dies are enclosed in the groove 20 in the hub ring, being perfectly closed by the toothed rim members 21 and 22. Oil is supplied to the said groove through openings 29, extending from grooves 30 provided on the inner side of the hub ring. The rim of the wheel is kept from movement axially by the teeth 25 and the dies 28.

The wheel shown in Figs. 4 and 5, operates in the same manner as the wheel shown in Figs. 1 and 2, and has the same advantages as the said wheel.

Preferably, the springs are located as near the periphery of the wheel as possible. Owing to this arrangement weaker springs may be used, the yielding capacity of the wheel being thereby increased, which in many cases is important, especially in double or multiple gearings, for instance of the type shown in Figure 7. In this said figure 31 is a rapidly rotating driving shaft (of an electric motor or the like), which by means of a pinion 32 rotates three toothed wheels 33, fixed on shafts 34. The said shafts 34 rotate by means of pinions 35 a toothed wheel 36 fixed on a shaft 37. The toothed wheels 33 are constructed in accordance with this invention. Owing to the provision of the springs in the said wheels the three gearings located between the shafts 31 and 37 will fully partake in the transmission of the power, in spite of faults in the manufacture of the wheels or the mounting of same, which, as is well known, can never be entirely obviated.

Compared with plate-springs provided between the hub and the toothed rim, as is the case in some yieldable wheels hitherto used, the provision of spiral springs results in the great advantage of a greatly increased yielding capacity for the same amount of spring.

The invention is applicable also to belt-pulleys and the like. The wheels or transmission members in question may be used in all cases in which a soft transmission of motion is desired. The invention may be modified in many respects and is not confined to the examples given.

I claim:

1. In a resilient driving connection, the combination with a rotatable member and a surrounding member divided transversely to the axis of rotation, of projections jammed between the parts of the surrounding member, dies located in a groove in the member first mentioned and provided with lateral pins engaging recesses in the member, said projections and dies being arranged in sets and the projection of each set disposed between the dies of the set, helical springs located between the said sets and bearing with their ends centrally and directly against the projections and dies, and pockets provided in the members for the said springs and adapted to guide the springs laterally.

2. In a resilient driving connection, the combination with a driving member having projections and a driven member, having projections, said projections being arranged in sets and the projections of the one member disposed between the projections of the other member, of helical springs located between the said sets and bearing with their ends centrally and directly against the projections, closed pockets provided in the members for the said springs and adapted to guide the springs laterally, a groove provided in the inner side of the inner member and containing lubricating oil, and a conduit connecting the said groove and the said pockets.

In testimony whereof I have hereunto affixed my signature.

WILHELM ROBERT UGGLA.